United States Patent [19]

Anderson

[11] Patent Number: 4,633,464

[45] Date of Patent: Dec. 30, 1986

[54] CONTROL SIGNALLING ARRANGEMENT FOR A DIGITAL TRANSMISSION SYSTEM

[75] Inventor: Cleo D. Anderson, Colts Neck, N.J.

[73] Assignee: AT&T Bell Laboratories, Murray Hill, N.J.

[21] Appl. No.: 521,377

[22] Filed: Aug. 8, 1983

[51] Int. Cl.[4] .......................... H04J 3/12; H04B 9/00
[52] U.S. Cl. ............................. 370/111; 370/110.4;
375/3; 455/601
[58] Field of Search ............... 370/110.1, 110.4, 111;
371/49, 51; 340/825.44, 825.47; 455/601;
375/3, 21, 22

[56] References Cited

U.S. PATENT DOCUMENTS

| | | | |
|---|---|---|---|
| 4,015,083 | 3/1977 | Bellisio | 375/120 |
| 4,121,195 | 10/1978 | Jessop | 375/3 |
| 4,211,920 | 7/1980 | Wakabayashi | 455/601 |
| 4,300,239 | 11/1981 | Wakabayashi et al. | 455/601 |
| 4,313,224 | 1/1982 | Wakabayashi et al. | 455/601 |
| 4,369,523 | 1/1983 | Seki et al. | 455/601 |
| 4,387,460 | 6/1983 | Bootmy et al. | 370/111 |
| 4,393,493 | 7/1983 | Edwards | 370/110.4 |

OTHER PUBLICATIONS

Transmission Systems for Communications, 5th Ed., Bell Telephone Laboratories, 1982, pp. 686–688.
Ultrasonics Symposium Proceedings, Sep. 1979, "Crossed-Resonator SAW Filter: A Temperature-Stable Wider-Band Filter on Quartz", by R. L. Rosenberg et al., pp. 836–840.
AT&T Tender for TAT8 Lightwave Submarine Cable System, May 16, 1983, Technical Volume Section 7.1.2, pp. 7.1.2-50 to 7.1.2-58.

Primary Examiner—Joseph A. Orsino, Jr.
Attorney, Agent, or Firm—Richard B. Havill; Patrick E. Roberts

[57] ABSTRACT

A control signalling arrangement for a pulse transmission system uses a main data stream including a block parity channel. Control signals are transmitted from an end terminal to a repeater by inserting the control signals in periodically spaced bit positions of the block parity channel. At the repeater, the control signals are separated from the block parity channel for controlling the circuits or devices for maintenance operations.

5 Claims, 14 Drawing Figures

TABLE A

| FRAME | BLOCK | BIT POSITIONS | | | | | | | | | | | | | | | | | | | | | | | | PARITY |
|---|---|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | |
| 1 | 1 | | | | | | | | | | | | | | | | | | | | | | | | | P |
| | 2 | | | | | | | | | | | | | | | | | | | | | | | | | P |
| | 55 | | | | | | | | | | | | | | | | | | | | | | | | | P |
| | 56 | | | | | | | | | | | | | | | | | | | | | | | | | P |
| 2 | 1 | | | | | | | | | | | | | | | | | | | | | | | | | P |
| | 2 | | | | | | | | | | | | | | | | | | | | | | | | | P |
| 3 | 55 | | | | | | | | | | | | | | | | | | | | | | | | | P |
| | 56 | | | | | | | | | | | | | | | | | | | | | | | | | P |
| 4 | 1 | | | | | | | | | | | | | | | | | | | | | | | | | P |
| | 2 | | | | | | | | | | | | | | | | | | | | | | | | | P |
| | 55 | | | | | | | | | | | | | | | | | | | | | | | | | P |
| | 56 | | | | | | | | | | | | | | | | | | | | | | | | S |
| 1 | 1 | | | | | | | | | | | | | | | | | | | | | | | | | P |

TABLE B

| BITS | COMMAND CODE WORD FORMAT |
|---|---|
| 1 | EVEN PARITY FOR SIGNAL BITS |
| 2-10 | REPEATER ADDRESS |
| 11-12 | RELAY CONTROL |
| 13-16 | OPERATION TO BE PERFORMED |
| 17-19 | REGENERATOR IDENTIFICATION |
| 20 | END BIT - ALWAYS A "1" |

CONTROL SIGNALLING ARRANGEMENT FOR A DIGITAL TRANSMISSION SYSTEM

BACKGROUND OF THE INVENTION

This invention relates to a control signalling arrangement for a digital transmission system and more particularly to a control signalling arrangement that transmits by way of a command channel superimposed on a system parity channel.

Line monitoring and fault locating functions are used in the prior art to maintain a digital transmission system. One method used for line monitoring is to determine a bit error rate by inserting at the transmitting terminal a block parity bit in a predetermined position in the data stream after each block of data. Each block of data and its block parity bit are analyzed for block parity violations at the receiving terminal or at an intermediate point along the line. Any block parity violations are countered over a period of time and are computed into a bit error rate. One arrangement for line monitoring in accordance with the foregoing description has been disclosed in U.S. Pat. No. 4,121,195.

Fault locating is a procedure used for determining which repeater section of the line is the source of a trouble condition when the line monitoring arrangement indicates there is an inordinately high bit error rate.

A problem with the prior art line monitoring and fault locating systems is that they are separate from the main transmission system and add significant expense to the construction and operation of the system.

SUMMARY OF THE INVENTION

This problem is solved by a control signalling arrangement for a pulse transmission system using a main data stream including a block parity channel. Control signals are transmitted from an end terminal to repeaters by inserting the control signals in periodically spaced bit positions of the block parity channel. At the repeaters, the control signals are separated from the block parity signals and are decoded for controlling selectively circuits or devices for maintenance operations.

BRIEF DESCRIPTION OF THE DRAWING

The invention may be better understood by reading the following detailed description with reference to the appended drawing wherein.

DETAILED DESCRIPTION

Figures 1, 2, 3:
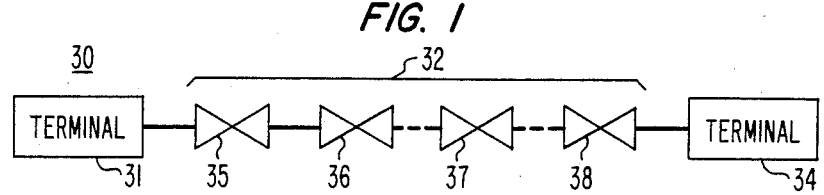
FIG. 1 is a block diagram of a digital transmission system including a repeatered line.
FIG. 2 is a table showing the framing format of a pulse stream for the transmission system of FIG. 1.
FIG. 3 is a table showing the format of command code words used for control signalling in the system of FIG. 1.

FIG. 1 shows an optical fiber transmission system 30 arranged for deployment under an ocean. It is designed to transmit pulse code modulation signals from a west end terminal 31 through a repeatered line 32, which may be as long as several thousand kilometers, to an east end terminal 34. Simultaneously another pulse stream is transmitted from the east end terminal 34 to the west end terminal 31. The optical pulse streams are attenuated in fibers along the line. At repeaters 35, 36, 37 and 38 located regularly along the line, the pulse streams are regenerated to insure good quality transmission. Although only four repeaters are shown in FIG. 1, as many as a hundred or more repeaters may be used in the line. Thus the line is shown broken between repeaters 36, 37 and 38 to indicate that additional repeater sections may be inserted.

A block parity error detecting scheme is used in the system for monitoring continuously the quality of signal transmission in both directions along the line.

As shown in TABLE A in FIG. 2, the pulse code modulation line signals are formatted in repetitive groups of four frames, each frame including fifty-six blocks of encoded data. Each block includes twenty-five bits. There are twenty-four data bits plus an even block parity bit P in each block except the last block 56 of frame 4. The block parity bits are located in the last bit position of the blocks. The blocks of data are transmitted from terminal to terminal in both directions simultaneously. Thus the block parity bits in a frame provide a block parity channel in both directions of transmission from terminal to terminal through the entire length of the system.

In addition to measuring end-to-end bit error rate, a maintenance signalling system is superimposed on this block parity channel for controlling the monitoring of in-service performance of the repeater sections, for controlling the substitution of spare devices or equipments in repeaters located on the ocean floor, and for controlling other functions such as substituting one fiber for another fiber.

In the block parity channel, one parity bit position of every fourth frame is assigned to maintenance signalling. This repetitive bit position S, located in the last bit position of block 56 in frame 4 in FIG. 2, is used for transmitting commands from either one of the terminals out along the repeatered line toward the other end terminal. A resulting bit stream of one-out-of-224 bits in the block parity bit channel is ignored at the far end for determining the bit error rate of the system. Hereinafter this stream of signalling bits is referred to as a command channel for maintenance signalling. Such command current is available in both directions in the system so that maintenance signalling can be initiated from either end terminal.

The maintenance signalling is used in the transmission system for performing a variety of functions. A bit error rate can be determined selectively at every line section in the system on an in-service basis. The automatic gain control voltage and the laser bias current of every regenerator can be monitored selectively. By remote control, spare equipments, such as laser transmitters, regenerators and fibers, can be switched to replace other similar failing or failed equipments in the system.

Such maintenance signalling is accomplished by encoded commands sent out along the repeatered line in either command channel. For reasons of clarity, only one channel is to be described hereinafter, however, it is to be understood that the description is applicable to the maintenance, or command, channels for both directions of transmission.

TABLE B of FIG. 3 shows a command code word format which is used for maintenance signalling in the transmission system. There are twenty bits per command code word. The first bit is an error detecting parity bit for that word. It is selected to provide even parity for the bits of the command code word. Bits 2–10 are address bits for addressing individually the repeaters along the line. Nine bits are used for addresses to enable the addressing of as many as 512 line repeaters in a very long transmission line. Two bits 11 and 12 are used for controlling relays to switch spare equipment in place of failing equipment. Four bits 13–16 are encoded with information for directing which one of sixteen possible operations is to be performed at the addressed repeater. Another three bits, 17–19, identify which of up to eight regenerator circuits at the addressed repeater is the subject of the command. Lastly an end bit 20 is inserted. In the command code words, the end bit is always a "1".

Figure 4:
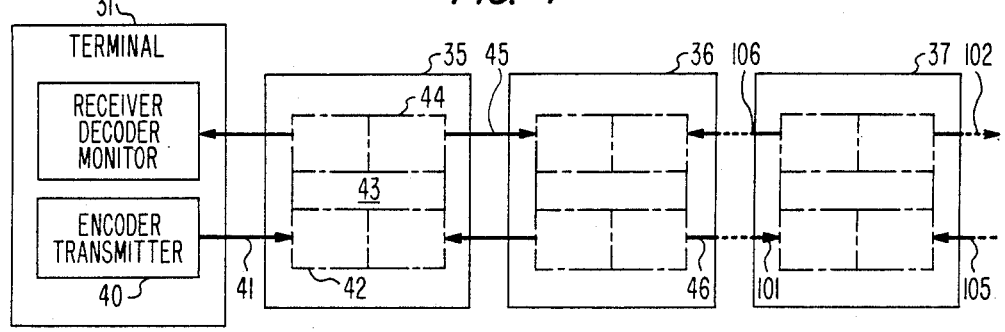
FIG. 4 is a block diagram of a portion of a repeatered transmission line of FIG. 1.

Referring now to FIG. 4, there is shown a block diagram of a portion of the transmission system of FIG. 1. The same designators, used in FIG. 1, are used in FIG. 4 to identify elements which are common to both FIGS. 1 and 4.

In the west terminal 31, an encoder and transmitter 40 encodes command code words which are to be transmitted along the line of repeaters 35, 36 and 37 to a selected one of the repeaters or to all of the repeaters. The coded command words are transmitted along an optical fiber 41 to an eastbound receiver-regenerator circuit 42 located at the repeater 35. Upon detection in the circuit 42, the command code word is applied to, stored in, and decoded by common supervisory logic circuitry 43. This common supervisory circuitry is time shared by the eastbound and westbound command channels at the repeater 35. Other similar chanels, not shown in FIG. 4, also can share the common supervisory circuitry 43 at the repeater 35.

Once decoded, the command code word controls performance of some function within the repeater 35 if that repeater is addressed by that code word. Whether or not the repeater 35 is addressed, the command code word is applied from the receiver-regenerator circuit 42 to an eastbound transmitter circuit 44 with the data stream for transmission over an optical fiber 45 to the next line repeater 36. Except for being inverted from top to bottom in FIG. 4 and except for individualized address decoding within the common supervisory circuitry, the repeater 36 is similar to the repeater 35. Again the command code word is transmitted with the data stream further along the repeatered line by way of an optical fiber 46.

Eventually the command code word is received at a repeater 37 which we assume is being addressed. The eastbound data stream is received on an optical fiber 101 and is transmitted on a fiber 102. Likewise the westbound data stream is received and transmitted, respectively, on fibers 105 and 106.

Figure 5:
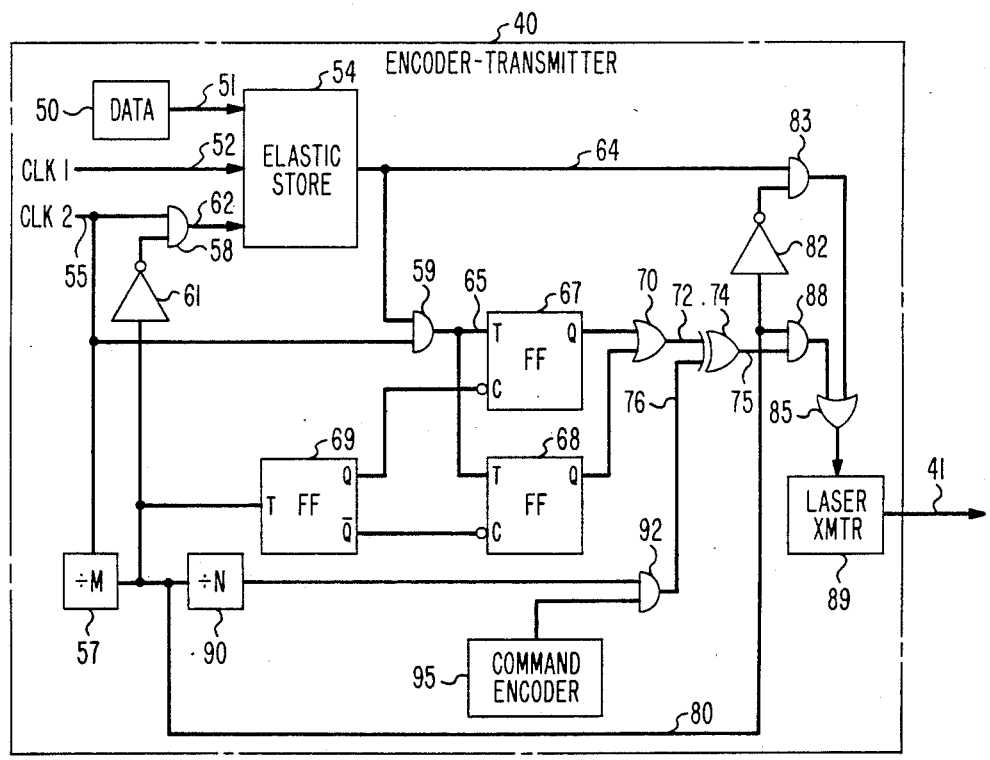
FIG. 5 is a logic diagram for an encoder-transmitter circuit used in a terminal of the transmission line of FIG. 4.

Referring now to FIG. 5, there is shown in detail the terminal encoder and transmitter circuit 40 of FIG. 4. In FIG. 5, the circuit 40 is arranged for inserting block parity bits into the main data bit stream. A data stream is generated electronically by a data source 50 and is applied to a lead 51 at a rate of $$\frac{M-1}{M} f_b.$$

Factor M is the number of bit positions in a block and therefore equals 25 in this example. Parameter $f_b$ is the bit rate of the system which may be, for example, $296 \times 10^6$ bits/sec. In parallel with the data stream, there is applied by way of a lead 52 an input clock signal CLK 1 for writing the input data into an elastic store 54. Clock signal CLK 1 operates at the rate $$\frac{M-1}{M} f_b$$

of the input data stream.

The elastic store 54 is a known arrangement for receiving a data stream at one constant clock rate and transmitting that data stream at a slightly different clock rate. Average rates of input and output data flow are the same. An example of such an elastic store is described on pages 686–688 of "Transmission Systems for Communications", 5th Edition, Bell Telephone Laboratories, Inc., 1982.

A transmitter clock signal CLK 2 at the bit rate $f_b$ is applied by way of a lead 55 for timing the output data stream to be transmitted along the repeatered line. In the encoder and transmitter circuit 40, the transmitter clock signal CLK 2 is applied to the input of a digital divider circuit 57 and to a pair of AND gates 58 and 59. The divider circuit 57 divides the rate of the transmitter clock signal CLK 2 by the factor M to produce a modified clock signal at a rate of $(1/M)f_b$. This modified clock signal is complemented by an inverter 61 and is applied as a gating input to the AND gate 58.

AND gate 58, being responsive to the transmitter clock signal CLK 2 and to the inverted modified clock signal, applies a read clock signal by way of a lead 62 to the elastic store 54. That read clock signal on the lead 62 includes M-1 pulses at the bit rate $f_b$ followed by a gap of one pulse duration.

Since the data stream stored in the elastic store 54 is read out in response to the clock signal on the lead 62, the output on a lead 64 is a repetitive stream of M-1 data bits followed by a vacant pulse time slot. The clock rate for reading out is the bit rate $f_b$ of the transmitter clock signal CLK 2.

The bit stream on the lead 64 is applied to the AND gate 59 together with the transmitter clock signal CLK 2. In response to those inputs, the AND gate 59 reproduces the output data stream of lead 64 on a lead 65 for driving the inputs of a pair of toggle flip-flops 67 and 68. The flip-flops 67 and 68 are both triggered by each "one" pulse of the data bit stream to count modulo-2 for the purpose of determining an even block parity bit to be insrted in the output bit stream.

Although both of the flip-flops 67 and 68 are arranged to count the ones in the data bit stream, they count modulo-2 alternatively. They are enabled for alternate counting by the complementary outputs Q and $\bar{Q}$ of a toggle flip-flop 69, which are applied to their respective clear inputs. Outputs of the flip-flops 67 and 68 are ORed through a gate 70 to produce on a lead 72 a bit stream from which block parity bits are to be selected.

The bit stream on the lead 72 is applied to an EXCL OR gate 74 which transmits that same bit stream onto a lead 75 while a low level input signal is applied over another input lead 76. This mode of transmission occurs most of the time.

A transmitter output gating arrangement combines the output data stream on the lead 64 with block parity bits which are selected from the bit stream on the lead 75. While the divider circuit 57 is counting M-1 pulses, its output on a lead 80 is low. This low signal on the lead 80 enables alternatively one of a pair of AND gates. The low signal on the lead 80 is inverted by an inverter 82 and enables an AND gate 83 to transmit M-1 bits of the data stream from the lead 64 to an OR gate 85. Simultaneously the other AND gate 88 is disabled for blocking transmission of the stream of bits from which the block parity bit is to be selected. When the gap in the data stream arrives in the $M^{th}$ time slot of the data block, the divider circuit 57 is applying a high signal to the lead 80. The AND gate 83 is disabled, and the AND gate 88 is enabled by the high signal on the lead 80. As a result the data stream, which is static on the lead 64 during this gap interval, is blocked from the OR gate 85 while an even block parity bit is selected from the lead 75 and is applied to the input of the OR gate 85. Thus the even block parity bit is inserted into the output data bit stream in the $M^{th}$ time slot of the data block.

This process repeats to produce a continuous electronic data bit stream which is converted by a laser transmitter 89 into an optical pulse stream which is transmitted out on the optical fiber 41. The data bit stream includes M-1 data bits followed by the even block parity bit. All of the even block parity bits P are located in repetitive positions, i.e. a block parity channel, in the transmitted optical stream, as shown in FIG. 2.

As just described, the encoder and transmitter circuit 40 transits a data stream with even block parity bits 40 inserted in a block parity channel. The block parity bits are used for determining a bit error rate either along the line of repeaters shown in FIG. 1 or at least terminal.

An advantageous system command signalling channel is superimposed on the block parity channel by some additional logic circuitry that is included in the encoder and transmitter circuit 40. In this regard a divider circuit 90 is interposed to respond to the divided clock signal on the lead 80 producing a further reduced control clock signal pulse rate. The divider circuit 90 divides by a factor N which equals the number of blocks times the number of frames between signalling bits, as shown in FIG. 2. The factor N is determined by system parameters to be discussed with respect to FIG. 13.

The control clock signal from the divider circuit 90 is applied to an AND gate 92 which is gated by pulses of the command code words. Normally the control clock signal from the divider circuit 90 is at a low or ground level which disables the AND gate 92. The resulting low level output signal from AND gate 92 on lead 76 allows the stream of block parity bits to be transmitted through the EXCL OR gate 74 and the lead 75 to the output AND gate 88. When the control clock signal from the divider circuit 90 occasionally rises to its high level, the AND gate 92 may produce a high level signal is produced on the lead 76 only when the output of a command encoder 95 and the control clock signal both are high concurrently. This high level signal on the lead 76 causes the block parity bit on the lead 72 to be complemented and put out on the lead 75 by the EXCL OR gate 74.

The complemented block parity bit is transmitted through the AND gate 88 and the output OR gate 85 in the block parity channel the same as other block parity bits. Significantly this complemented block parity bit, or signalling bit S, is inserted into the block parity channel in the last block of every fourth frame, however the output of the command encoder 95 is high. Because the signalling bits S are positioned cyclically, a command signalling channel is superimposed on the block parity channel. From this command channel, the signalling bits S can be recovered readily along the repeatered line or at the east terminal. The recovered complemented block parity bits, or signalling bits S, are detected and decoded into signals for controlling equipment or circuits, in accordance with the command code word format described previously with respect to FIG. 3.

Figure 6:
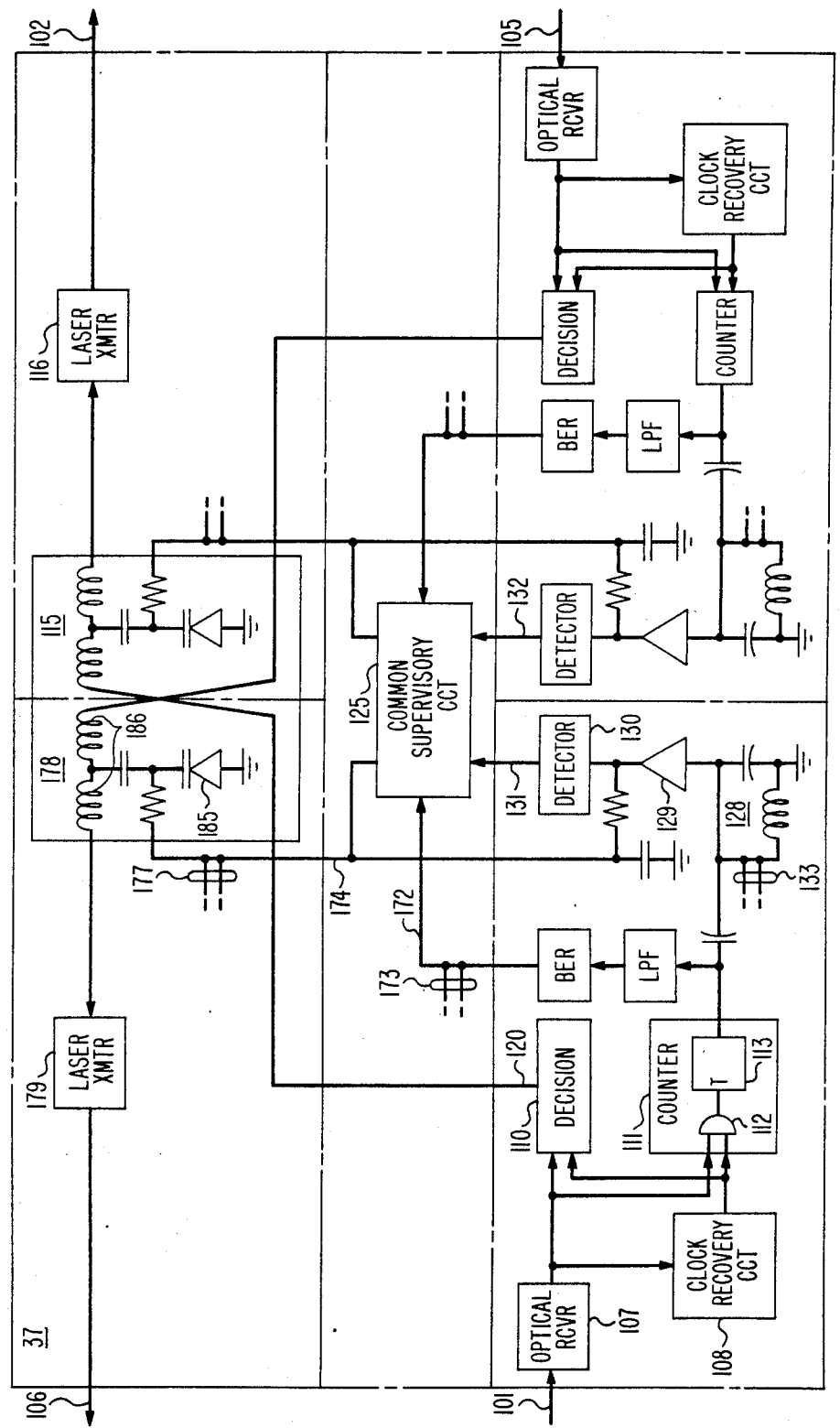
FIG. 6 is a partial block diagram of a repeater for the transmission line of FIG. 4.

Referring now to FIG. 6, there is shown a diagram of the line repeater circuit 37 which is arranged for both eastbound and westbound transmission. Therefore duplicate symmetrically designed circuits are included for the two way transmission. An optical data stream being transmitted eastbound is received on an optical fiber 101, is regenerated within the circuit 37, and is transmitted further along the repeater line on another optical fiber 102. Optical fibers 105 and 106, respectively, receive and transmit an optical pulse stream for westbound transmission. Since there is symmetrical duplication within the circuit 37, operation of the circuit 37 is to be described primarily for one direction of transmission.

Considering eastbound transmission, the optical line signals received on the fiber 101 are converted to electronic signals by an optical receiver 107. The resulting electronic signals are applied to a clock recovery circuit 108 and a decision circuit 110. The clock recovery circuit 108 is a known arrangement such as a surface acoustic wave (SAW) filter, which is described by R. L. Rosenberg and L. A. Coldren in the *Ultrasonics Symposium Proceedings*, September 1979, pp. 836-840, or a phase-locked, frequency-locked loop, which is described in U.S. Pat. No. 4,015,083, issued to J. A. Bellisio. The output of the clock recovery circuit 108 is applied to the decision circuit 110 and to a modulo-2 counter 111. The decision circuit 110 is arranged in accordance with a circuit described in a U.S. patent application, Ser. No. 495,067, which was filed May 13, 1983 in the name of R. M. Paski.

In response to the received data stream and the recovered clock pulses, the decision circuit 110 determines whether received pulses are zeros or ones at the times that the recovered clock pulses occur. Output signals from the decision circuit 110 are a regenerated version of the received bit stream. Thus they are retimed and reshaped signals which appear on a lead 120 for continued transmission along the repeatered line. The regenerated signals traverse a modulator arrangement 115 and are applied to a laser transmitter circuit 116 which converts the electronic pulses into optical pulses. The regenerated optical pulses are produced on the optical fiber 102 for continued transmission along the repeatered line toward the east terminal.

The modulo-2 counter 111 also responds to the recovered clock pulses and the received data stream, both of which are applied to an AND gate 112. Output signals from the AND gate 112 are a series of retimed pulses which are applied to a toggle flip-flop 113. This toggle flip-flop 113 is alternately set and reset by succeeding ones in the received bit stream producing output signals in a modulo-2 count.

The output signals of the modulo-2 counter 111, are used for oral purposes. One purpose is to determine a bit error rate. Another advantageous purpose is to help detect the command code word signals which are transmitted in the command signalling channel superimposed on the block parity channel being transmitted from the west terminal.

Figure 7:
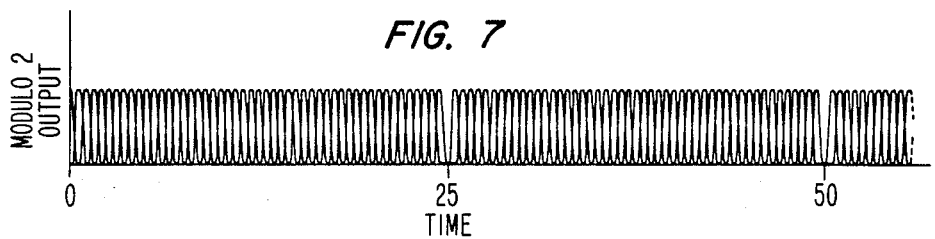
FIGS. 7, 8, 9 and 10 are waveforms relating to operation of the repeater shown in FIG. 6.

Referring now to FIG. 7, there is shown a typical repetitively swept waveform from the output of the modulo-2 counter 111 during regular error free transmission. Because even block parity is used, the output of the modulo-2 counter produces a very distinctive bit stream when error free transmission occurs. As long as there are no errors nor command signals, the first 24 bits of each block of data from the modulo-2 counter are random ones and zeros, as shown by the envelope of the waveform during those bit positions. As shown in FIG. 7, the output bit in the block parity bit time slot of each block is always zero because the state of the modulo-2 counter was initially zero. If the counter state initially is a one, then all of the block parity bits are one during error free transmission. Thus a string of all zeros or all ones is generated in the 25th time slot, or the block parity channel.

Referring again to FIG. 6, the output waveform of the modulo-2 counter 111 is filtered through a low pass filter LPF and is applied to a bit error rate circuit BER, which includes an amplifier and a threshold detector. A counter for determining the number of threshold crossings and thus the number of errors which occur during a test interval is included in a common supervisory circuitry 125 of the repeater circuit 37. No command code words are transmitted during any interval in which block errors are being counted.

Figure 8:
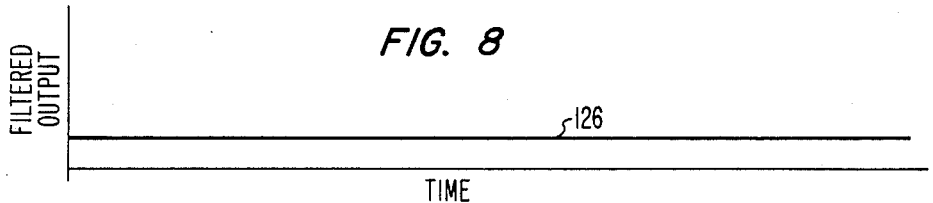

FIG. 8 shows the result of low pass filtering of the output of the modulo-2 counter 111 when the system is transmitting error free and without command signals. A signal 126 of uniform potential is produced and applied to the bit error rate circuit BER.

Figure 9:
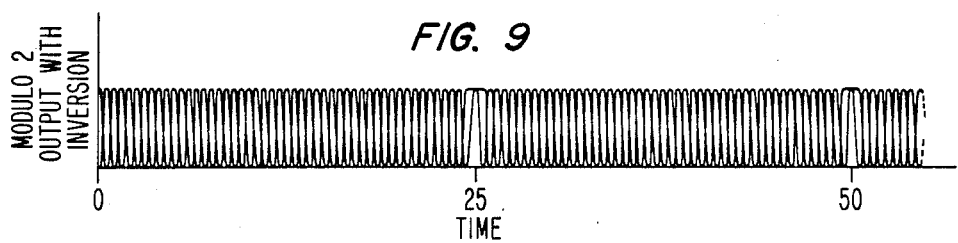

Referring now to FIG. 9, there is shown a typical repetitively swept waveform from the output of the modulo-2 counter 111 after an error occurs following a series of zero pulses in the block parity channel time slot. A single error or an odd number of errors in the bits of a parity block cause the modulo-2 counter output bit in the block parity bit time slot to change from zero to a one because the counter 111 counts an odd number of ones during the parity block. The occurrence of the odd number of bits in the parity block complements the state of the pulse in the block parity channel from the zero level to the one level. A subsequent stream of bits from the modulo-2 counter 111 in the block parity channel are all ones, as shown in FIG. 9.

Figure 10:
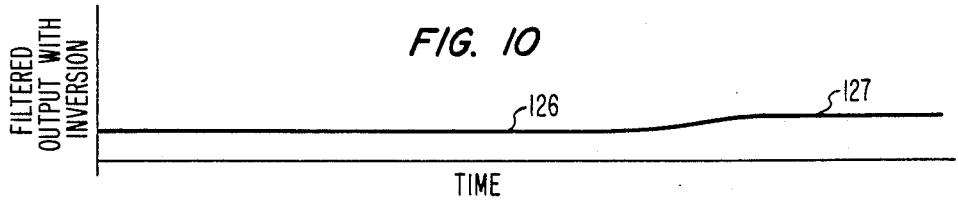

FIG. 10 shows the result of low pass filtering of the output of the modulo-2 counter when an error occurs in the parity block of data. The potential level shifts from the value 126 for the stream of all zeros to a different value 127 representing the stream of all ones. Such level shift is detected by the bit error rate circuit BER and is counted by the counter previously mentioned as residing in the common supervisory circuit 125 of FIG. 6. This new stream of ones from the modulo-2 counter in the block parity channel continues until another odd number of errors occurs in a subsequent parity block. At that time the bit in the block parity channel is inverted once again to zero.

Half of the bit error rate is determined by counting the number of zero to one transitions which occur during a predetermined interval. The low pass filter LPF is designed to pass all signal components at frequencies below approximately 7 kHz. The cutoff frequency of the filter LPF determines the dynamic range of the bit error rate circuit BER. Such dynamic range is between approximately $10^{-12}$ and $10^{-5}$.

Figure 11:
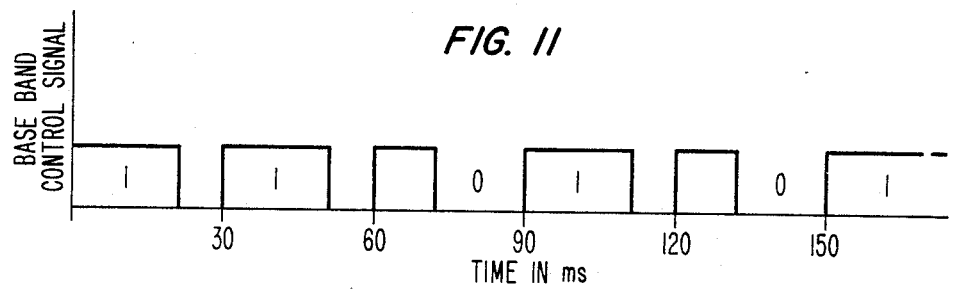
FIG. 11 is a waveform of a baseband supervisory signal which is pulse width encoded for transmission.

FIG. 11 shows a pulse stream representing a part of a command code word as a baseband signal. Low speed signals are used for the command signals. Pulse time slots of approximately 30 ms are marked on the time axis. Ones and zeros are represented as wide and narrow pulses, respectively. A one is a 20 ms wide pulse, and a zero is a 10 ms wide pulse. This baseband command signal is generated by the command encoder 95 of FIG. 5. Several signalling bit time slots occur at the output of the divider circuit 90 in FIG. 5 while the baseband command code word signal from the command encoder 95 is at the high level for either a one or a zero. Concurrent high inputs to the AND gate 92 produce a high output signal on the lead 76 for causing a block parity on the lead 72 to be complemented and put out on the lead 75 by the EXCL OR gate 74. Thus the signalling bit S in the command channel is complemented every time that bit S time slot occurs while the baseband command code word signal is high.

A resulting stream of data with a string of complemented bits in the command channel is transmitted along the repeatered line from west to east through the entire system including the repeater 37 of FIGS. 4 and 6. In the repeater the stream of data from the modulo-2 counter 111 including the complemented signalling bits S is applied through a bandpass filter 128 and an amplifier 129 to a detector 130. Since the complementing of the signalling bit occurs continuously over a relatively lengthy interval, it causes the filtered output of the amplifier 129 in FIG. 6 to shift back and forth between voltage levels like the shift shown in FIG. 10.

Figure 12:
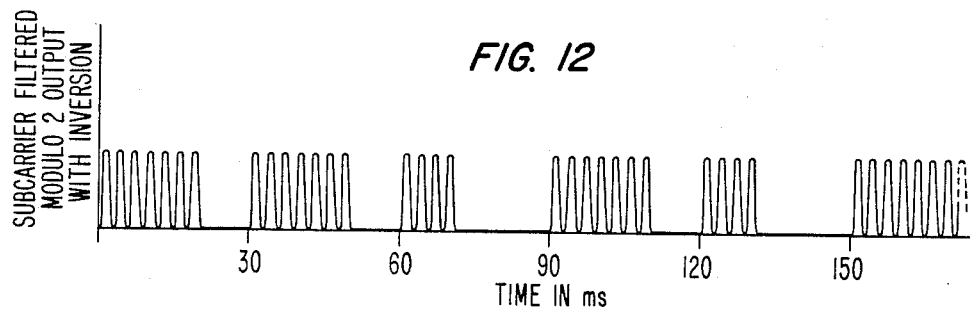
FIG. 12 is a waveform of subcarrier bursts which are encoded as pulsewidth modulated signals.

As shown in FIG. 12, this succession of alternating high and low level voltages is produced from the output of the amplifier 129 as a pulse width modulated subcarrier signal. Long bursts (approximately 20 ms) of the subcarrier represent ones. Short bursts (approximately 10 ms) of the subcarrier represents zeros.

The subcarrier frequency is the same for both the command signal and a response channel. The response channel is used for communicating information from the repeater 37 of FIG. 4 back through the repeatered line to the west terminal 31. A repetition rate for the signalling bit time slots determines the subcarrier frequency. The rate of transmitting the command pulses is determined by the obtainable signal-to-noise ratio on the command channel as well as on the response channel.

A jitter channel can be used to transmit the response information along the repeatered line back to the west terminal 31. Selection of the pulse rate for the command signalling channel depends largely upon the design of that jitter channel, which is described in greater detail in a U.S. patent application, filed concurrently herewith in my name.

Figure 13:
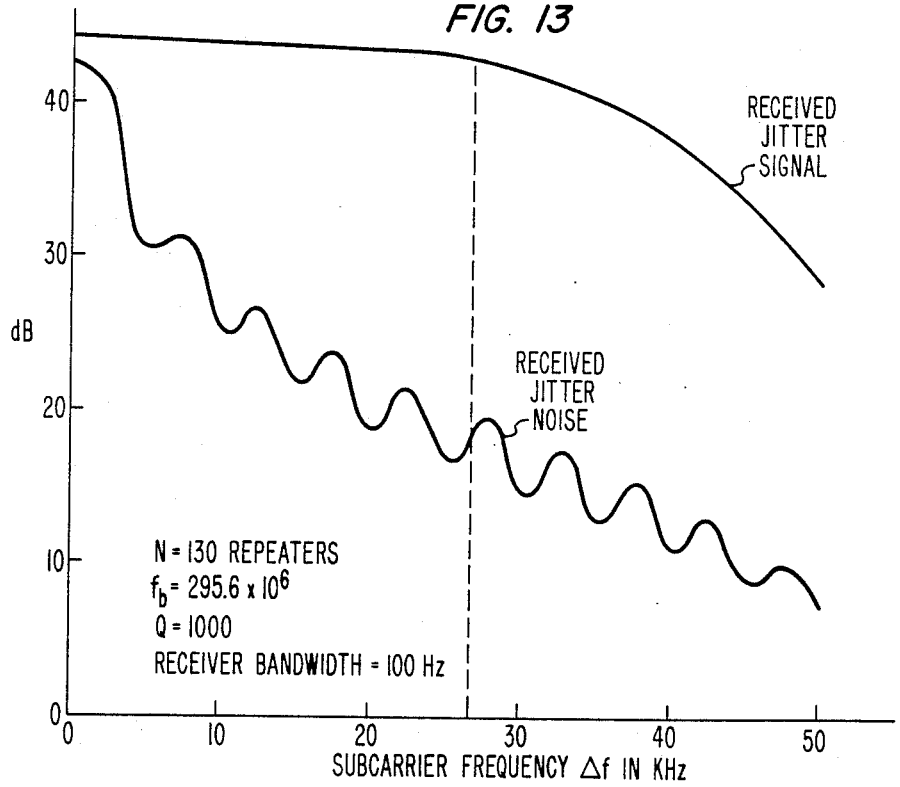
FIG. 13 presents signal and noise characteristic curves for a jitter channel used for responses in a transmission system having many repeaters.

Referring now to FIG. 13, there are shown signal and noise characteristic curves for a long transmission line having n repeaters wherein, as an example, n equals 130 repeaters. A subcarrier frequency is selected so that the received noise is suppressed more than 20 dB below the received signal while the signal is substantially at its maximum level. It is noted by a dotted line in FIG. 13 that a subcarrier frequency of approximately 27 kHz is a suitable frequency for the type of retiming circuit used for deriving the curves of FIG. 13. This selection together with considerations relating to fitting the command signal bits S into the repetitive positions in the block parity channel of FIG. 2 determines the precise subcarrier frequency.

Referring once again to FIG. 6, command signals are recovered from the block parity channel by filtering the output of the modulo-2 counter 111 through a bandpass filter with a center frequency of approximately 27 kHz. The resulting signal is amplified through the amplifier 129 as pulse width modulated subcarrier signals, as shown in FIG. 12. The detector 130 receives the filtered output from the bandpass filter 128. Detector 130 being an envelope detector produces a baseband pulse stream similar to the baseband pulse stream of FIG. 11. This reproduced baseband data stream representing the command code word is applied by way of a lead 131 to the common supervisory circuit 125 in FIG. 6.

Command signals from other repeater modulo-2 counters are multiplied by way of leads 133 to the input of the bandpass filter 128 for other eastbound regenerator circuits to communicate with the common supervisory circuit and back to the terminal.

The common supervisory logic circuit 125 temporarily stores the detected command code word pulses, decodes the command code words, and produces control signals for controlling predetermined operations of circuits and apparatus at the repeater location.

For example error monitoring can be accomplished on any selected regenerator section. A first command code word is transmitted to all repeaters in the system. This command code word clears the error counter in every repeater location. Upon being cleared, all of the error counters commence counting block parity errors. A second command code word, following a predetermined interval, terminates the counting at all repeaters and causes the resulting block-error count to be stored at each repeater location. No command code words are transmitted during the interval in which block parity errors are counted. Following these two interval setting commands, the repeater locations are polled individually for transmitting their respective stored block-error count back to the end terminal.

Figure 14:
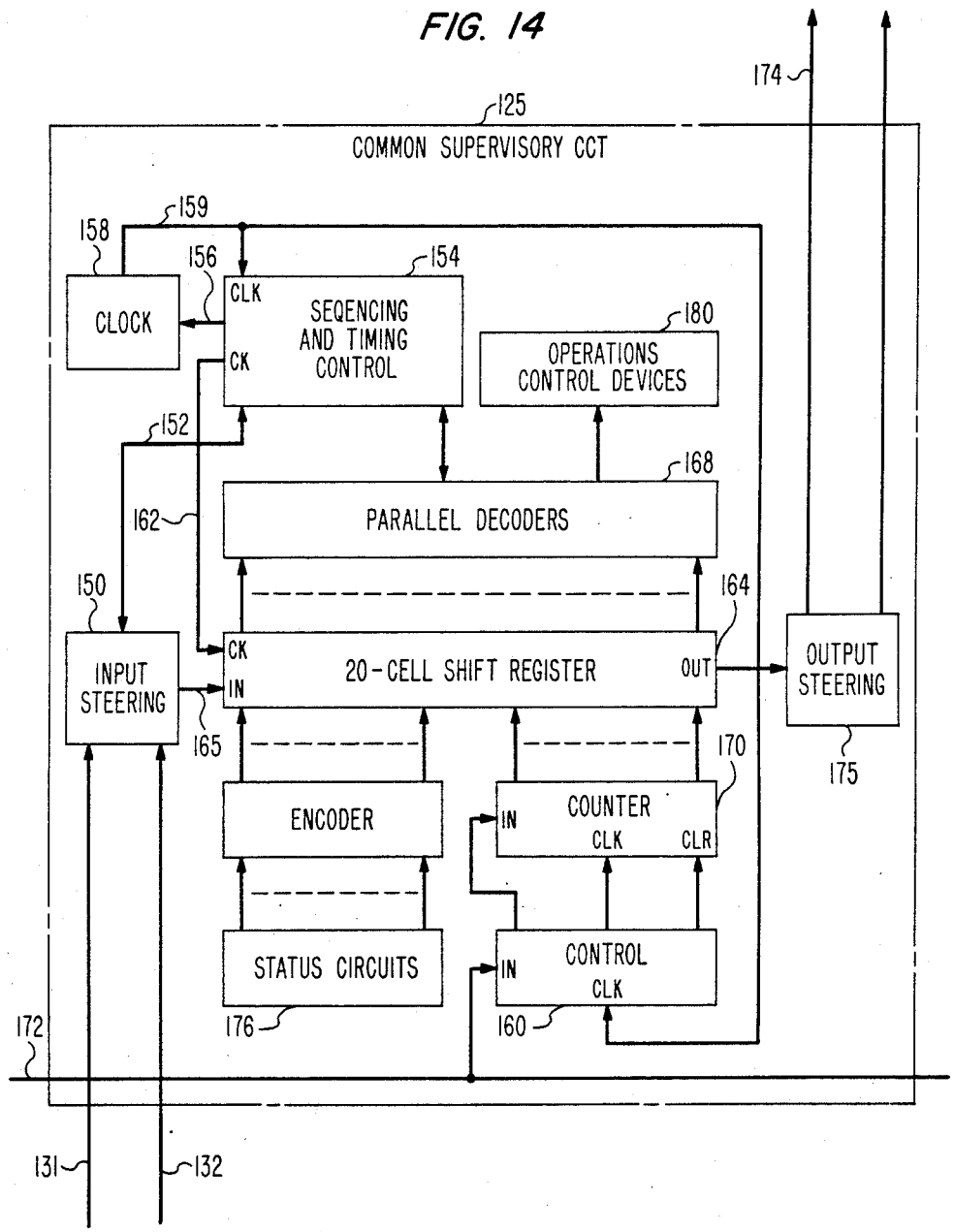
FIG. 14 is a block diagram of a common supervisory circuit used in the repeater of FIG. 6.

Referring now to FIG. 14, there is shown a common supervisory circuit 125 for receiving the command code words from the terminal, for receiving error signals from the regenerators, for controlling equipments at the repeater, and for sending messages back to the terminal.

In FIG. 14 the command code words from the west terminal appear on the lead 131 and from the east terminal on a lead 132. They are applied to an input steering circuit 150. The east and west terminals are controlled so that command signals from only one of them are transmitted at a time. The first pulse of any command code word is coupled through a bus 152 to a sequencing and timing control circuit 154 for initiating operation of the common supervisory control circuit 125. This first pulse from the west terminal also temporarily inhibits processing of commands from the east terminal.

Sequencing and timing control circuit 154 includes sequential logic circuits for producing control signals that enable the various parts of the supervisory control circuit 125 to step through a series of states. First of all a signal is applied by way of a lead 156 to a local clock generator 158 for initiating a series of clock pulses at the pulse rate of the command code words. These clock pulses are applied by way of a lead 159 to clock inputs of the sequencing and timing control circuit 154 and a counter control circuit 160.

Clock pulses applied to the sequencing and timing control circuit 154 accomplish the stepping control within the sequencing and timing control circuit 154 and are delayed therein by half of a pulse time slot. For each command code word, twenty of the delayed clock pulses are produced and applied by way of a lead 162 to the clock input of a 20-cell shift register 164.

Twenty bit recovered command code words in the baseband waveform of FIG. 11 are applied from the lead 131 of FIG. 14 through the input steering circuit 150 and a lead 165 to the serial data input of the shift register 164. These bits are clocked into the shift register by the delayed clock pulses on the lead 162.

Upon receipt of the last, or end, bit of each command code word, the decoders 168 decode the received code word. The repeater address, the regenerator identification, and the operation to be performed are decoded. If the address received matches the assigned address of the repeater, the last bit is a one, and the parity even, signals are generated by the decoders 168 and by the sequencing and timing control circuit 154 for performing the desired operation.

There is one command word that is an exceptional word in that the supervisory control circuit in all repeaters respond. That code word is an all zeros word. It is used for initiating a bit error rate determination by causing the state of a counter 170 to be reset at all repeaters. Bit errors which are detected subsequently by the bit error rate circuit BER of any regenerator are counted in its respective counter 170. The bit error rate circuits BER associated with the eastbound regenerators of the repeater 37 of FIG. 6 are shown multipled by way of a lead 172 to the supervisory control circuit 125 and also shown in FIG. 14. Counting is terminated simultaneously in all repeaters by sending any code word with at least a single one in it. The resulting count is held in the counter until it is accessed. Another code word addressing any specific repeater can initiate transmission of the stored count back to the west terminal.

During this operation the end bit of the command code word, a one, is extended for an interval of two code words. In FIGS. 6 and 14, this extended end bit puts a continuous subcarrier signal on a lead 174 of FIG. 6 to provide a carrier signal for transmitting a response back to the west terminal.

In a first part of that extended end bit interval, the command code word stored in the shift register 164 is read out of the shift register through an output steering circuit 175 to the lead 174 of FIG. 14. The pulse stream applied from the output of the shift register 164 is converted by the steering circuit 175 to a pulse width modulated baseband signal. This pulse width modulated signal modulates the subcarrier on the lead 174 of FIG. 6 into pulse width modulated bursts of the subcarrier.

In a second part of that interval, the contents of the counter 170 and encoded contents of status circuits 176 are parallel loaded into the shift register 164. Thereafter this information is read out serially through the output steering circuit 175 to the lead 174 for transmission by way of a laser transmitter 179 to the west terminal. A modulator arrangement 178 in FIG. 6 modulates the main westbound data stream with the pulse width modulated bursts of subcarrier. A resulting response jitter channel in the westbound main data stream transmits the two response code words to the west terminal. Other modulator arrangements are multipled from the lead 174 by way of leads 177 for transmitting through other selectable laser transmitters and optical fibers not shown.

At the west terminal these two response code words are received and decoded. The first code word verifies the address of the repeater from which the block error count information is being received. The count is analyzed together with error count interval information which is retained at the terminal for determining a bit error rate.

Once the block error count is taken at all repeaters over the common interval, each of the repeaters along the line or any selected set of the repeaters can be polled to determine a bit error rate at each repeater section of the entire transmission line.

It is noted that the block error counting, the subsequent interrogation and response to the terminal, and the determination of the bit error rate are accomplished while the main transmission line is in its regular operating condition. Error monitoring from end to end is not affected by the command signalling because the error monitoring circuits located at the terminals is designed to ignore the last block parity bit of every frame of data. This does not adversely effect the error monitoring. Thus the described command channel provides an advantageous in-service system maintenance signalling capability.

Other command code words are used to perform other operations or to operate other circuits at the repeater location. In FIG. 14 a group of operations control devices 180 performs in response to decoded command code words. Some advantageous functions which are controlled thereby include reading laser bias current, reading automatic gain control voltage, operating relays to change laser transmitters, and operating relays to change optical fibers.

The foregoing describes an embodiment of the invention. This embodiment together with others obvious in view thereof are considered to be within the scope of the invention.

What is claimed is:

1. A control signaling arrangement for a pulse transmission system having a main data stream including frames of data, each frame including plural blocks of data, the main data stream including a block parity channel carrying block parity signals, one parity bit per block, through at least one line repeater; the arrangement comprising means for generating a control signal including a command code word having a plurality of bits;

means for sampling each bit of the command code word and inserting a different one of several samples of each bit of the command code word of the control signal in each of several periodically spaced bit positions of the block parity channel, each one out-of-N of the blocks of said main data stream containing one of the sample bits of the command code word;

means located at the line repeater and responsive to the main data stream for recovering from the main data stream information carried by the block parity signals and including the control signal and the block parity error signals;

means responsive to the recovered information for separating the control signal including the command code word from the recovered information; and means responsive to the recovered information for separating the block parity error signals from the recovered information.

2. The control signaling arrangement of claim 1 wherein the means for separating the control signal from the recovered information comprise a bandpass filter having a center frequency which is substantially equal to 1/(2T), where T is the time between periodically spaced control bit positions of the block parity channel.

3. The control signaling arrangement of claim 1 wherein the means for separating the block parity error signals from the recovered information comprise a low-pass filter that rejects the control signal and passes frequency components of the block parity error signals.

4. A control signaling arrangement in accordance with claim 1 wherein the separating means, located at the line repeater remote from the inserting means, inclues a modulo-2 counter responsive to the main data stream for counting the number of ones in the main data stream;

a first series circuit comprising a bandpass filter and an envelope detector responsive to the count of the number of ones in the main data stream for recovering the bits of the command code word; and a second series circuit comprising a low pass filter and a bit error rate detector responsive to the count of the number of ones in the main data stream for determining an indication of block errors.

5. A control signaling arrangement in accordance with claim 4 further comprising a common supervisory circuit means, interconnected with the envelope detector and responsive to the command code words recovered by the separating means, for controlling predetermined operations of selectable equipment at the line repeater.

* * * * *